United States Patent
Hara (10) Patent No.: US 7,805,539 B2
(45) Date of Patent: Sep. 28, 2010

(54) DATA TRANSFER APPARATUS AND DATA RECEIVING APPARATUS, AND DATA TRANSFER SYSTEM

(75) Inventor: Kenichiroh Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 12/056,373

(22) Filed: Mar. 27, 2008

(65) Prior Publication Data

US 2008/0244093 A1    Oct. 2, 2008

(30) Foreign Application Priority Data

Mar. 30, 2007   (JP)   ............... 2007-093414

(51) Int. Cl.
    *G06F 15/16* (2006.01)
(52) U.S. Cl. .............. 709/246; 709/230; 358/501; 358/539
(58) Field of Classification Search .............. 709/230, 709/247, 246; 707/3; 710/13, 8; 348/207.1; 358/1.15, 1.13, 501, 539; 345/501
    See application file for complete search history.

(56) References Cited

U.S. PATENT DOCUMENTS

| | | | |
|---|---|---|---|
| 2004/0179221 A1* | 9/2004 | Endo et al. | 358/1.13 |
| 2004/0184078 A1* | 9/2004 | Endo et al. | 358/1.15 |
| 2005/0149640 A1* | 7/2005 | Hosokawa | 710/8 |
| 2005/0251578 A1* | 11/2005 | Kraslavsky | 709/230 |
| 2007/0103553 A1* | 5/2007 | Hara | 348/207.1 |
| 2007/0257922 A1* | 11/2007 | Kamata et al. | 345/501 |
| 2007/0260809 A1 | 11/2007 | Hara et al. | |
| 2008/0010255 A1* | 1/2008 | Lee et al. | 707/3 |
| 2008/0126588 A1* | 5/2008 | Chong | 710/13 |

FOREIGN PATENT DOCUMENTS

| | | |
|---|---|---|
| JP | 05-035620 A | 2/1993 |
| JP | 05-067009 | 3/1993 |
| JP | 2001-177561 A | 6/2001 |
| JP | 2006-086862 | 3/2006 |
| JP | 2006-087050 | 3/2006 |

* cited by examiner

*Primary Examiner*—Jungwon Chang
(74) *Attorney, Agent, or Firm*—Cowan, Liebowitz & Latman, P.C.

(57) ABSTRACT

When multimedia data made up of a plurality of related files is transferred to a data receiving apparatus, a single data object that includes the plurality of related files is generated in a format supported by the data receiving apparatus. This data object is then transferred to the data receiving apparatus, and therefore the data receiving apparatus can confirm the relationship between the plurality of files.

12 Claims, 10 Drawing Sheets

EXAMPLE OF VIDEO OBJECT AT TIME OF TRANSFER

DATA TRANSFER APPARATUS AND DATA RECEIVING APPARATUS, AND DATA TRANSFER SYSTEM

BACKGROUND OF THE INVENTION

1. Field of the Invention

The present invention relates to a data transfer technique, and particularly relates to a data transfer technique for transferring multimedia data composed of a plurality of files (such as still images, video, audio, text, and the like).

2. Description of the Related Art

Image recording devices that capture images, record video, and so on, such as digital cameras, digital video cameras, DVD recorders, and HDD recorders, have recently become widespread. Furthermore, transferring broadcasted programs recorded using a stationary-type recording device to a handheld device and viewing those programs while in a vehicle is also becoming common.

However, because the handling of multimedia data has always involved heavy processing, there are many cases where mobile phones, handheld music/video players, and the like place limitations on the formats of the multimedia data that they support. For example, there are situations where video data can only be played back if it is of a specific encoding format and of a specific resolution.

Meanwhile, some electronic devices handle a plurality of files as a single piece of multimedia data. When transferring data to such a device in order to use that data in the device, it is also necessary to communicate the relationship of the plurality of files to the device to which the data is being transferred.

In other words, when transferring data to another device in order to use that data in the device, it is not sufficient to simply transfer the data; it is also necessary to transfer the data to the appropriate place, in a file configuration that the electronic device to which the data is being transferred can interpret. Otherwise, the device to which the data has been transferred cannot properly handle the data, and thus the data transfer itself is meaningless.

Object-based communication protocols are becoming common as protocols for transferring multimedia data between electronic devices and information processing devices. PTP (Picture Transfer Protocol) and MTP (Media Transfer Protocol) can be given as examples of object-based communication protocols. A characteristic of object-based communication is that no specialized knowledge is required in order to configure the devices to communicate with one another.

When transferring data to a device that handles a plurality of files as a single piece of multimedia data, it is necessary to communicate the relationship of the plurality of files with object-based communication, too.

Meanwhile, there is a conventional file transfer system that groups a plurality of files together and sequentially transfers the files (see Japanese Patent Laid-Open No. H5-67009).

The conventional image transfer system disclosed in Japanese Patent Laid-Open No. H5-67009 improves the transfer efficiency by grouping a plurality of files together and sequentially transferring the files between data processing apparatuses.

However, the image transfer system disclosed in Japanese Patent Laid-Open No. H5-67009 lacks a scheme for communicating the relationship of the plurality of files transferred as a group to the destination device. Accordingly, the disclosed system cannot be applied as-is when transferring a plurality of files using an object-based protocol such as PTP or MTP to an electronic device that handles that plurality of files as a single piece of multimedia data.

SUMMARY OF THE INVENTION

It is an object of the present invention to solve such problems with the background art. That is, it is an object of the present invention to provide a data transfer apparatus that can communicate the relationship of a plurality of files transferred using an object-based data transfer protocol to the destination device, a data receiving apparatus suitable for use with the data transfer apparatus, and a data transfer system configured of the data transfer apparatus and the data receiving apparatus.

According to an aspect of the present invention, there is provided a data transfer apparatus for transferring multimedia data made up of a plurality of files to a data receiving apparatus using an object-based data transfer protocol, comprising: an object generation unit that generates a single data object having a format supported by the data receiving apparatus, the data object including the plurality of files; a notification unit that communicates format information indicating the format of the generated data object to the data receiving apparatus prior to the data object being transferred; and a transfer unit that transfers the data object to the data receiving apparatus in accordance with the data transfer protocol.

According to another aspect of the present invention, there is provided a data transfer apparatus for transferring multimedia data made up of a plurality of files to a data receiving apparatus using an object-based data transfer protocol, comprising: a notification unit that notifies the data receiving apparatus that the plurality of files are related files prior to the plurality of files being transferred; and a transfer unit that transfers each of the plurality of files as a single data object to the data receiving apparatus in accordance with the data transfer protocol.

According to yet further aspect of the present invention, there is provided a data receiving apparatus for receiving a data object from a data transfer apparatus in accordance with an object-based data transfer protocol, comprising: a first receiving unit that receives format information indicating the format of the data object to be transferred from the data transfer apparatus; a second receiving unit that receives the data object from the data transfer apparatus; a separating unit that separates the data object into a plurality of files based on the format information; and a storage unit that stores the separated plurality of files in a storage medium in accordance with a predefined rule, so that the files can be handled as related files.

According to further aspect of the present invention, there is provided a data receiving apparatus for receiving a data object from a data transfer apparatus in accordance with an object-based data transfer protocol, comprising: a first receiving unit that receives format information indicating the format of the data object to be transferred from the data transfer apparatus; a second receiving unit that receives the data object from the data transfer apparatus; and a storage unit that stores a plurality of data objects received by the second receiving apparatus in a storage medium in accordance with a predefined rule, so that the files can be handled as related files, based on the format information.

According to further aspect of the present invention, there is provided a data transfer system comprising the data transfer apparatus and the data receiving apparatus.

Further features of the present invention will become apparent from the following description of exemplary embodiments with reference to the attached drawings.

DESCRIPTION OF THE EMBODIMENTS

Preferred and exemplary embodiments of the present invention will now be described in detail in accordance with the accompanying drawings.

First Embodiment

In a data transfer system according to the present embodiment, in which a data transfer apparatus (a transfer source device) and a data receiving apparatus (a transfer destination device) are connected to one another, it is assumed that the data transfer apparatus and the data receiving apparatus use an object-based data transfer protocol, and to be more specific, use the aforementioned PTP.

Details regarding PTP can be found in PIMA 15740:2000, PHOTOGRAPHIC AND IMAGING MANUFACTURERS ASSOCIATION, INC. However, it should be noted that other object-based data transfer protocols can be used. For example, MTP, which is a set of extensions on PTP, may also be used.

Figure 1:
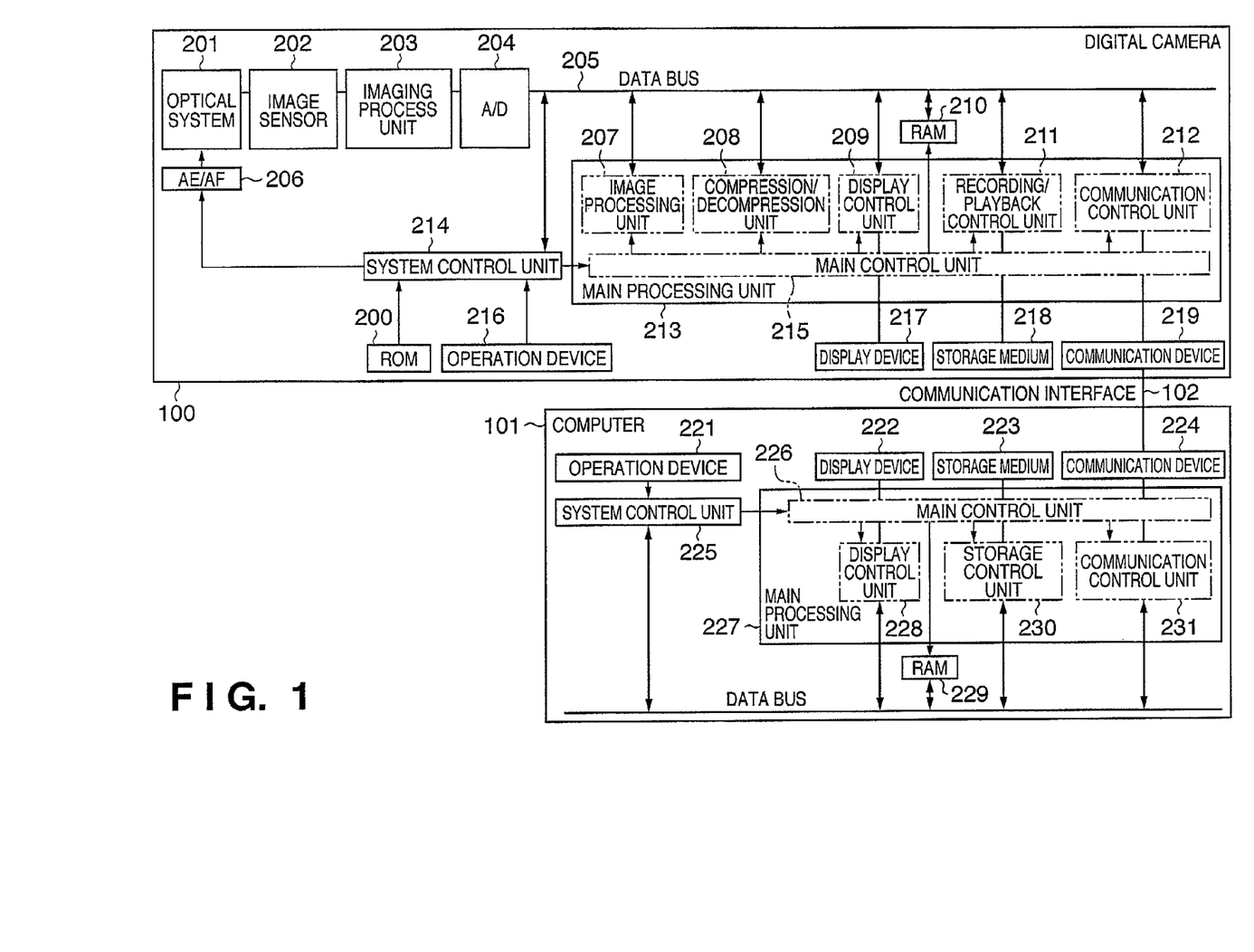
FIG. 1 is a diagram illustrating an exemplary configuration of a data transfer system according to an embodiment of the present invention.

FIG. 1 is a diagram illustrating an exemplary configuration of a data transfer system according to present embodiment.

The data transfer system illustrated in FIG. 1 is configured so that a computer 101, serving as an example of a data transfer apparatus, and a digital camera 100, serving as an example of a data receiving apparatus, are connected to one another in a communicable state via a communication interface 102.

Upon detecting a connection with the computer 101 via a communication device 219 during a playback mode, the digital camera 100 switches to a communication mode. Meanwhile, an application that makes it possible to request that video data be transferred to the digital camera 100 based on PTP is installed in the computer 101.

A light flux from a subject passes through an optical system 201, and is fixed upon an image sensor 202, each pixel of which the image sensor 202 is configured accumulates a charge based on luminosity, as illustrated in FIG. 1. The charge accumulated in the image sensor 202 is converted into an image signal by an imaging process unit 203. An analog image signal output from the imaging process unit 203 is converted into a digital image signal by an A/D converter 204, and is stored in a RAM 210 via a data bus 205.

A main processing unit 213 is configured of six units: an image processing unit 207, a compression/decompression unit 208, a display control unit 209, a recording/playback control unit 211, a communication control unit 212, and a main control unit 215.

The image processing unit 207 performs white balance processing, color interpolation processing, sharpness processing, smoothing processing, color balance processing, level correction processing, etc., on the digital image signal stored in the RAM 210, and outputs the resultant as digital image data.

The compression/decompression unit 208 has functionality for compressing (encoding) the digital image data processed by the image processing unit 207 according to coding techniques such as JPEG, JPEG2000, and so on, and for decompressing (decoding) compressed digital image data. The compression rate can be set by a user.

The display control unit 209 controls the display of a display device 217, which is an LCD or the like. More specifically, the display control unit 209 controls the display of a GUI, such as a menu screen, the display of captured images, and so on.

The recording/playback control unit 211 performs control involving writing to and reading from a storage medium 218, exemplified by a memory card, an optical disk, an HDD, or the like.

The communication control unit 212 controls the input/output of data through the communication device 219.

The main control unit 215 controls the operations of the constituent elements within the main processing unit 213.

A system control unit 214 is connected to the data bus 205, and is a microprocessor that executes a control program stored in a ROM 200, thereby performing overall control of the digital camera 100. The system control unit 214 also generates an image file that includes the digital image data compressed by the compression/decompression unit 208 and attached information thereof, and stores the generated image file in the RAM 210.

Here, the attached information included in the image file includes information regarding the image, information regarding the digital camera 100, a thumbnail of the digital image, and so on. The RAM 210 has a capacity sufficient for storing a plurality of image files. The system control unit 214 also has functionality for putting the digital camera 100 into a power-saving state.

When the digital camera 100 is in the power-saving state, the system control unit 214 turns off some functions of the digital camera 100, thereby reducing the amount of energy consumed. The ROM 200 stores information regarding the digital camera 100 and the like, including a control program used by the system control unit 214 for controlling the digital camera 100. Image data corresponding to GUIs, settings menus, and so on that are to be displayed in the display device 217 is also stored in the ROM 200.

An AE/AF control unit 206 implements automatic exposure control and automatic focus control by controlling a diaphragm in the optical system 201, controlling a focus lens, and so on, under the control of the system control unit 214.

An operation device 216 is a man-machine interface for the user to operate the digital camera 100, and includes various switches and buttons. The following switches and buttons can be given as specific examples. For example, the operation device 216 includes a power switch for turning the power on and off, a shutter button, and a menu button for displaying a settings menu in the display device 217. The operation device 216 also includes a directional key for moving a cursor displayed in the display device 217 up, down, left, and right, a "set" button for setting or selecting images, items, values, and the like that are highlighted by the cursor in the digital camera 100, and so on.

The shutter button has a half-depressed state and a fully-depressed state. When the shutter button is depressed halfway while the digital camera 100 is operating in an image capturing mode, the digital camera 100 performs AF, AE, and so on; when the shutter button is then depressed fully, the digital camera 100 executes imaging and storage.

The display device 217 displays information requested by the display control unit 209. Information regarding the digital camera 100, captured images, images stored in the storage medium 218, GUI images, and so on are displayed in the display device 217. When displaying an image stored in the storage medium 218, information of the image, information of the time the image was captured, and so on can also be displayed. When the display device 217 functions as an electronic viewfinder, various status indicators for the digital camera 100 (such as remaining battery life), image capturing parameters that have been set, and so on are displayed along with the image to be captured.

The recording/playback control unit 211 has functionality for writing image files stored in the RAM 210 into the storage medium 218, and functionality for reading out image files stored in the storage medium 218 from the storage medium 218 and writing those files into the RAM 210. The compressed digital image data in the image files read out from the storage medium 218 and written into the RAM 210 is decompressed by the compression/decompression unit 208 and then caused to be displayed in the display device 217 by the display control unit 209.

The storage medium 218 is a non-volatile memory card, an optical disk, an HDD, or the like, into which compressed digital image data stored in the RAM 210 is written via the recording/playback control unit 211. The storage medium 218 may be removable from the digital camera 100, or may be non-removable and integrated into the device itself. Note that in the present embodiment, image files are recorded into the storage medium 218 in accordance with a file system in accordance with the DCF (Design rule for Camera File) system. Video files are handled as a single piece of multimedia data that includes a DCF basic file and a DCF thumbnail file. However, the actual file configuration is not intended to be limited to DCF. Details of DCF can be found in the JEIDA specification: JEIDA 49-2-1998.

The communication device 219 is a wireless or hard-wired communication interface, and may be removable or non-removable with respect to the digital camera 100.

In the present embodiment, communication compliant with PTP is possible with the communication control unit 212. However, the protocol does not necessarily have to be PTP, as long as that protocol is an object-based protocol capable of handling multimedia data as a single object.

An operation unit 221 of the computer 101 includes an input device such as a keyboard or a mouse, and a system control unit 225 carries out control in accordance with operations performed via the operation unit 221. The system control unit 225 is a microprocessor that executes a control program stored in a ROM (not shown), thereby performing overall control of the computer 101.

A display device 222 is, for example, a liquid-crystal display monitor that displays a GUI and the like under the control of a display control unit 228. A RAM 229 is a volatile memory used by the system control unit 225 for executing an OS, applications, and so on in the computer 101.

A storage medium 223 is a device into/from which data is input/output under the control of a storage control unit 230, and is a non-volatile storage device. An OS, applications, and so on are stored in the storage medium 223. A communication device 224 is capable of communication with the communication device 219, and inputs/outputs data under the control of a communication control unit 231. The communication device 224 is a wireless or hard-wired communication interface, and may be removable or non-removable with respect to the computer 101.

A main processing unit 227 is configured of the display control unit 228, the storage control unit 230, the communication control unit 231, and a main control unit 226. The main control unit 226 controls the other control units within the main processing unit 227 under the control of the system control unit 225.

It should be noted that in the following descriptions, operations described as being performed by the digital camera 100 and the computer 101 are implemented by the respective system control units 214 and 225 executing control programs and controlling the units necessary to perform the stated operations.

Figure 2:
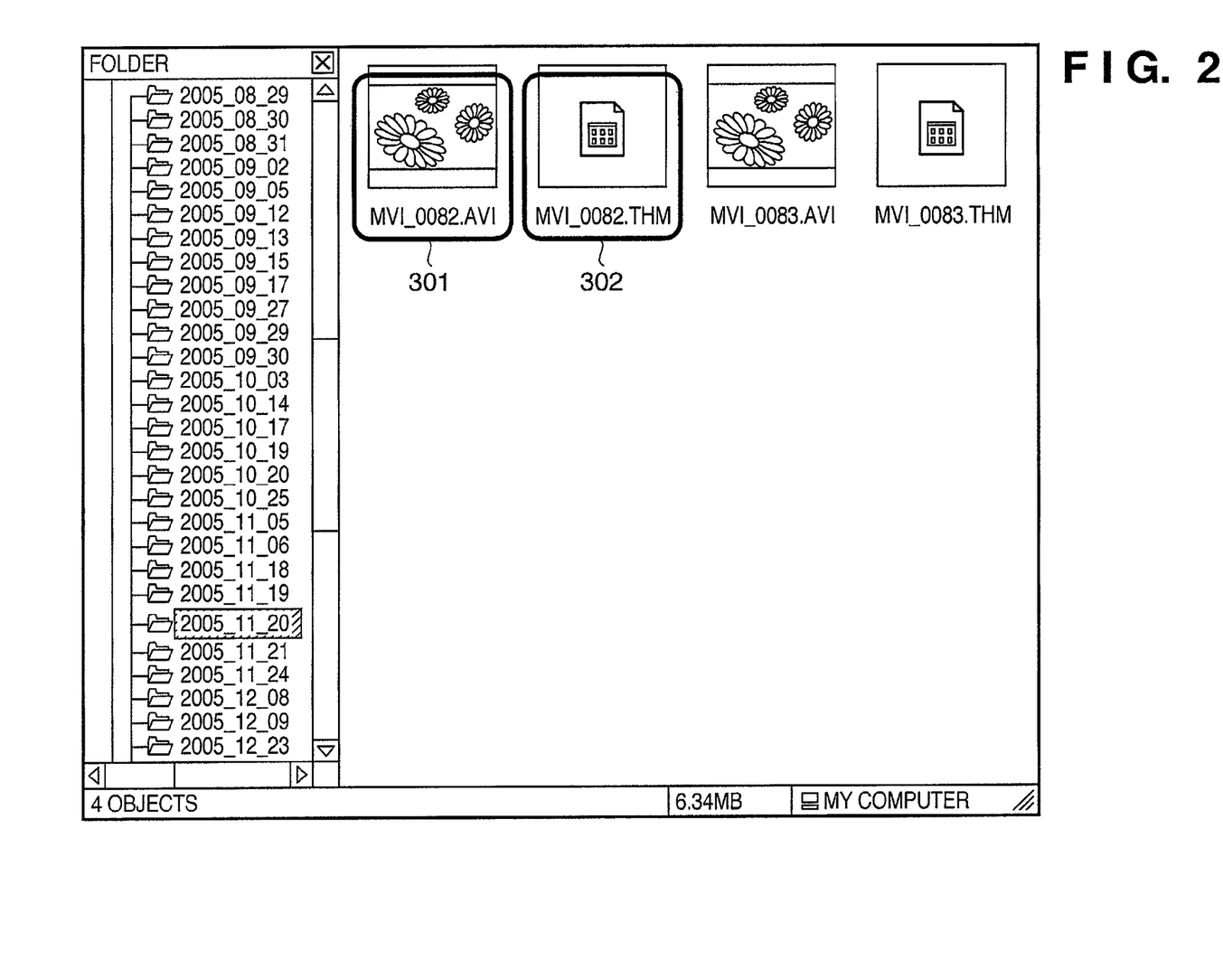
FIG. 2 is a diagram illustrating the file system of a computer 101 according to an embodiment of the present invention.

FIG. 2 is a diagram illustrating a file system of the computer 101 according to the present embodiment.

An AVI file 301 is a file in the Audio-Video Interleaving format, and is a video file. This AVI file 301 is a file that can be handled on its own by the computer 101 (i.e. a file that does not require other files during processes such as playback).

A THM file 302 is a thumbnail (representative still-image file) of the AVI file 301. This thumbnail file is necessary in order to fulfill the requirements of the DCF system, but is not absolutely necessary as long as the computer 101 handles a video file (the AVI file 301).

Figure 3:
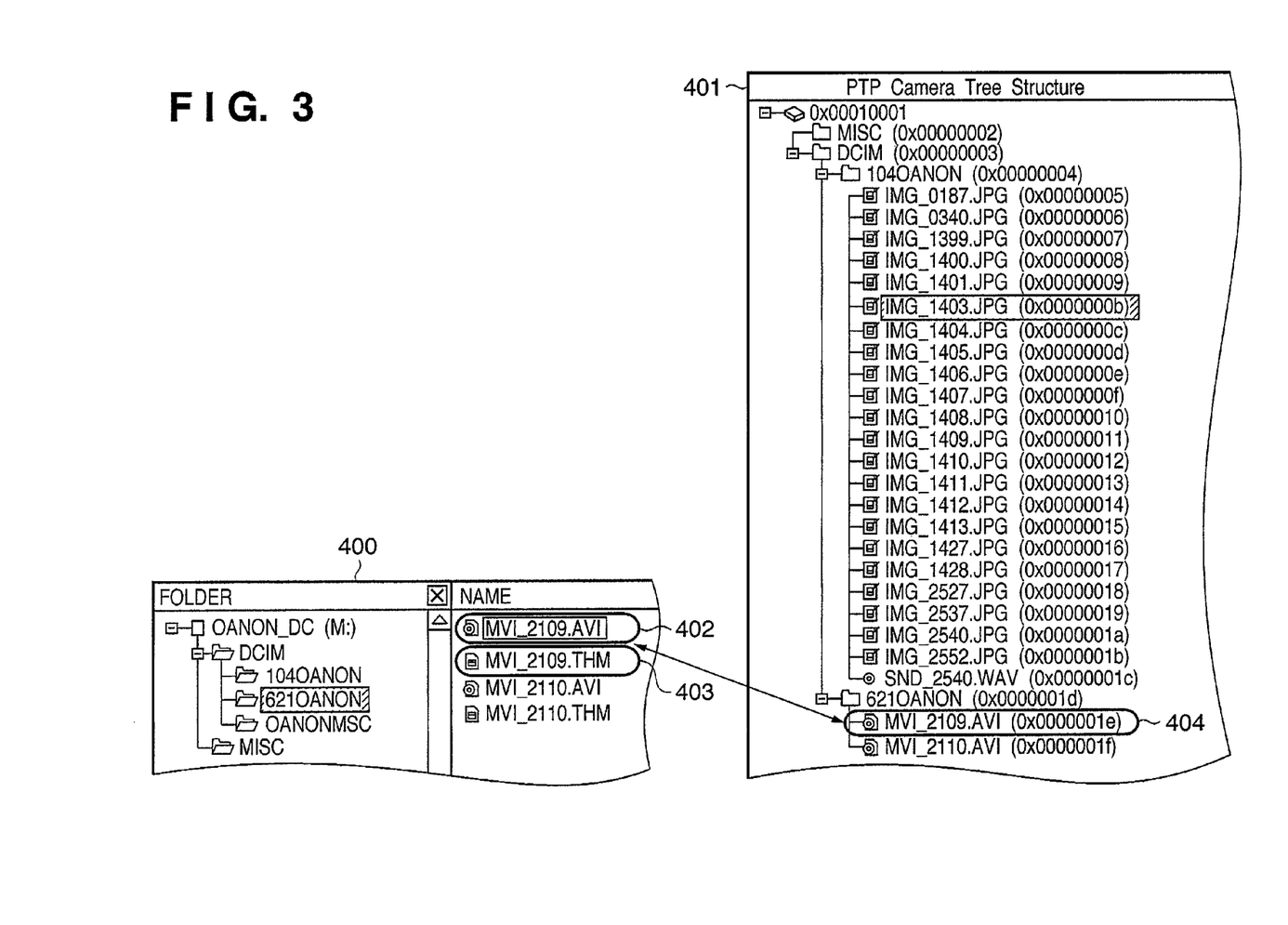
FIG. 3 is a diagram illustrating the file system of a digital camera 100 according to an embodiment of the present invention.

FIG. 3 is a diagram illustrating a file system of the digital camera 100 according to the present embodiment.

As described above, the digital camera 100 of the present embodiment stores files in accordance with DCF. In FIG. 3, the upper layer of the file configuration in the storage medium 218 is indicated by the number 400. An AVI file 402 is a DCF file. A THM file 403 is a DCF thumbnail (representative still-image) file of the AVI file 402.

The digital camera 100 can handle (play back, rewrite, delete, etc.) the AVI file 402 and the corresponding THM file 403, which is a DCF thumbnail file, as a single piece of video data (multimedia data).

An object structure 401 represents an object space implemented by the communication control unit 212 of the digital camera 100. This object structure 401 is seen as an object space when the computer 101 accesses the digital camera 100. The combination of the AVI file 402 and the corresponding THM file 403 configured in the storage medium 218 is represented as a single object 404 in the object space within the digital camera 100.

Figure 7:
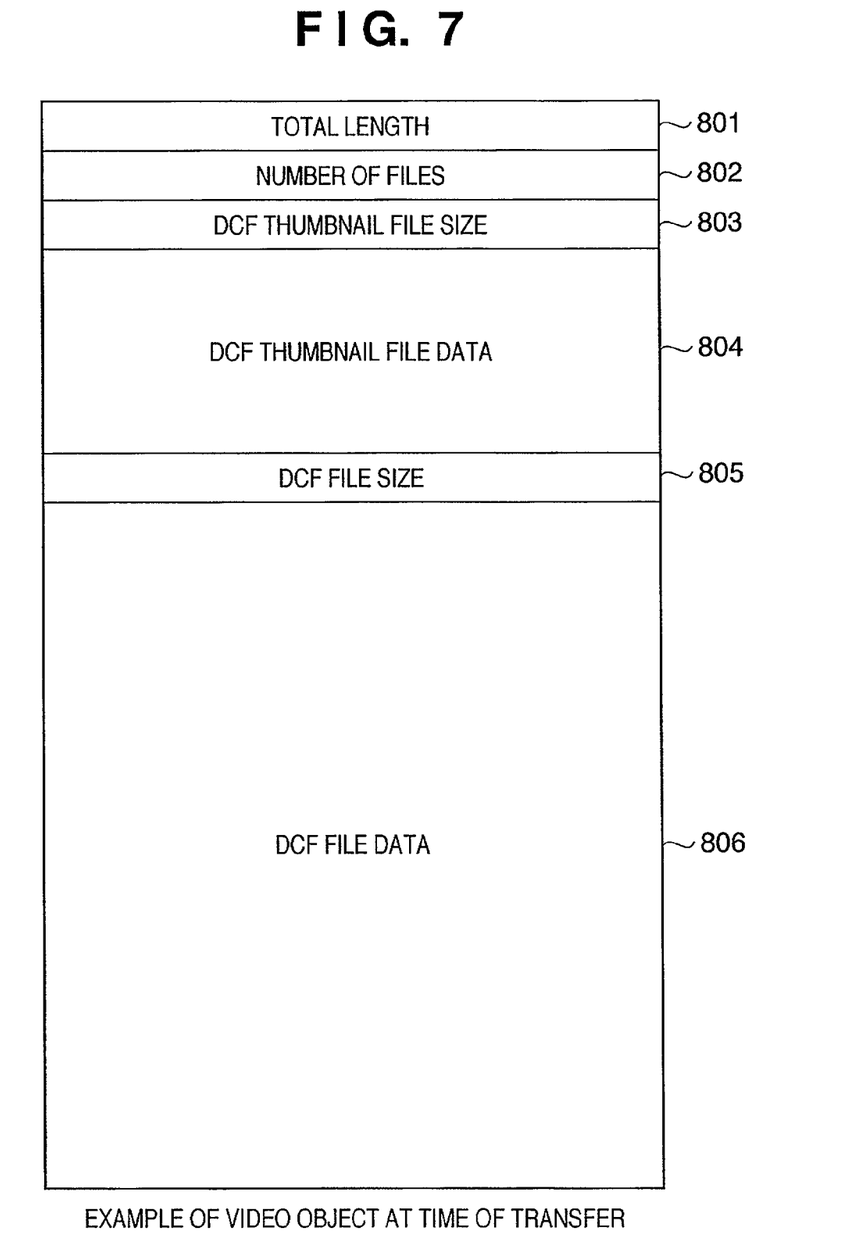
FIG. 7 is a diagram illustrating an exemplary data structure of a video object generated by the computer 101 and transferred to the digital camera 100 according to an embodiment of the present invention.

FIG. 7 illustrates an example of the data structure of a video object generated by the computer 101 and transferred to the digital camera 100 according to the present embodiment.

The overall length of the object data is stored in a data region 801, whereas the number of files that make up the object is stored in a data region 802. Furthermore, the file size of the DCF thumbnail is stored in a data region 803, the data of the DCF thumbnail is stored in a data region 804, the DCF file size is stored in a data region 805, and the data of the DCF file is stored in a data region 806.

In the present embodiment, because the file handled is a DCF file, the video file (AVI file) 402 is stored in the data region 806, and the corresponding THM file 403 is stored in the data region 804.

Figure 4:
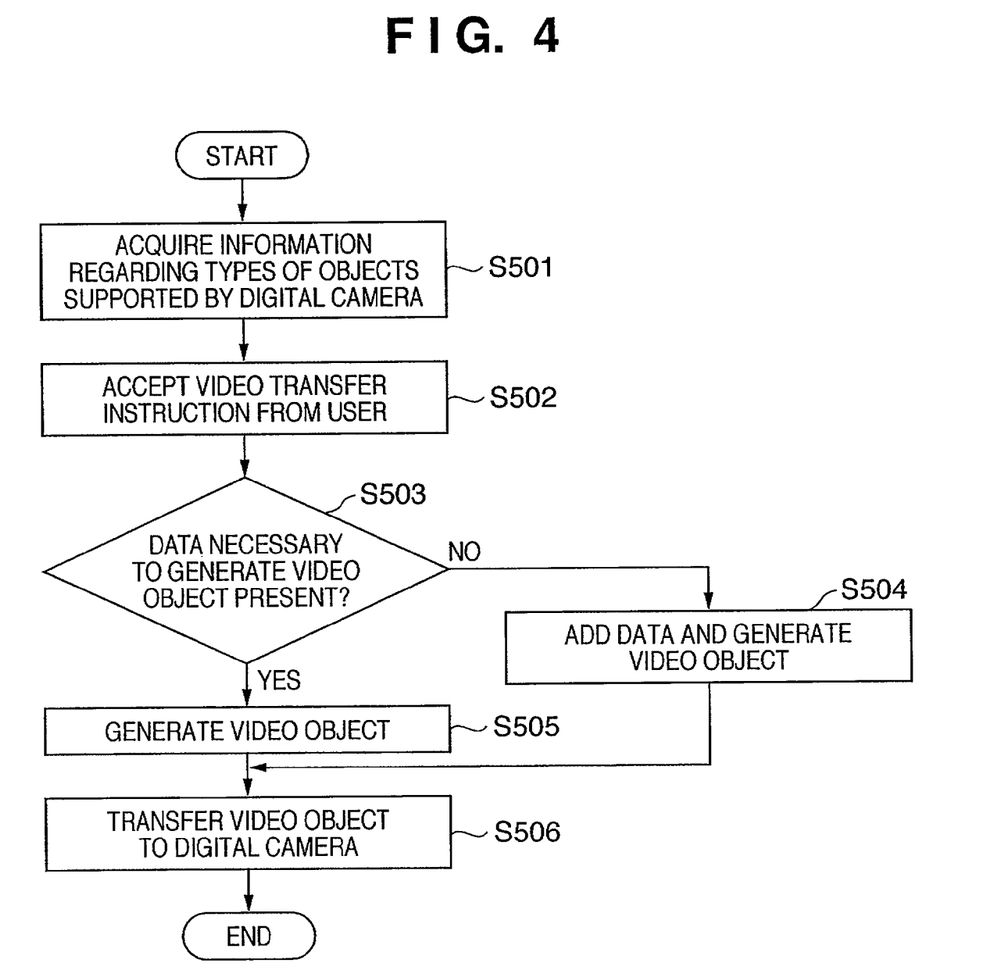
FIG. 4 is a flowchart illustrating operations of the computer 101 when the computer 101 transfers video data to the digital camera 100 according to a first embodiment of the present invention.

FIG. 4 is a flowchart illustrating operations of the computer 101 when the computer 101 transfers video data to the digital camera 100.

The processing described here assumes that a connection between the computer 101 and the digital camera 100 is established. First, in S501, the computer 101 requests capability information from the digital camera 100, and acquires the capability information, which includes information regarding the objects supported (i.e. able to be handled) by the digital camera 100.

Here, it is assumed that the acquired capability information indicates that the digital camera 100 supports the video object format (see FIG. 7) used in the present embodiment.

Next, in S502, the computer 101 accepts a video file transfer instruction from a user. For example, the computer 101 accepts a video file transfer instruction from the user based on an operation performed by that user on a GUI displayed in the display unit 222 via the operation unit 221.

Upon accepting the file transfer instruction, the computer 101 determines whether or not all the data necessary to generate a video object of a format supported by the digital camera 100 (in this case, the format illustrated in FIG. 7) is included in the instructed file (S503).

For example, there are cases where data necessary to generate a video object is missing, such as the case where file specified by the transfer instruction as a target file to be transferred does not include all the files required by the format of the video object to be generated. Therefore, when it has been determined that necessary data is missing, the computer 101 adds the necessary data and generates the video object (S504), after which the process moves to S506.

In the present embodiment, a single video object including a video file (AVI file) and a corresponding thumbnail file (THM file) is generated, as has been described thus far. Accordingly, when, for example, the user has used the application running on the computer 101 to select only the AVI file 301, and has instructed only the AVI file 301 to be transferred to the digital camera 100, the thumbnail file corresponding to the AVI file 301 is the missing data. For this reason, the computer 101 adds the missing data by creating a thumbnail file from the AVI file 301 or by searching for the THM file 302 that corresponds to the AVI file 301 within the storage medium 223.

On the other hand, when it has been determined that the data necessary to generate the video object is present, the computer 101 generates the video object from that data (S505), after which the process moves to S506. For example, if the user has selected the AVI file 301 and the corresponding THM file 302 and instructed these files to be transferred, the necessary data is present, and thus in S505, the computer 101 generates the video object.

In S506, the computer 101 transfers the generated video object to the digital camera 100 using a procedure based on PTP. For example, the computer 101 reads out the video object data stored in the RAM 229, and the communication control unit 231 controls the communication device 224 so as to transfer the data. Details regarding the transfer procedure shall be given later.

When the transfer of the video object ends, the transfer process itself ends.

Figure 5:
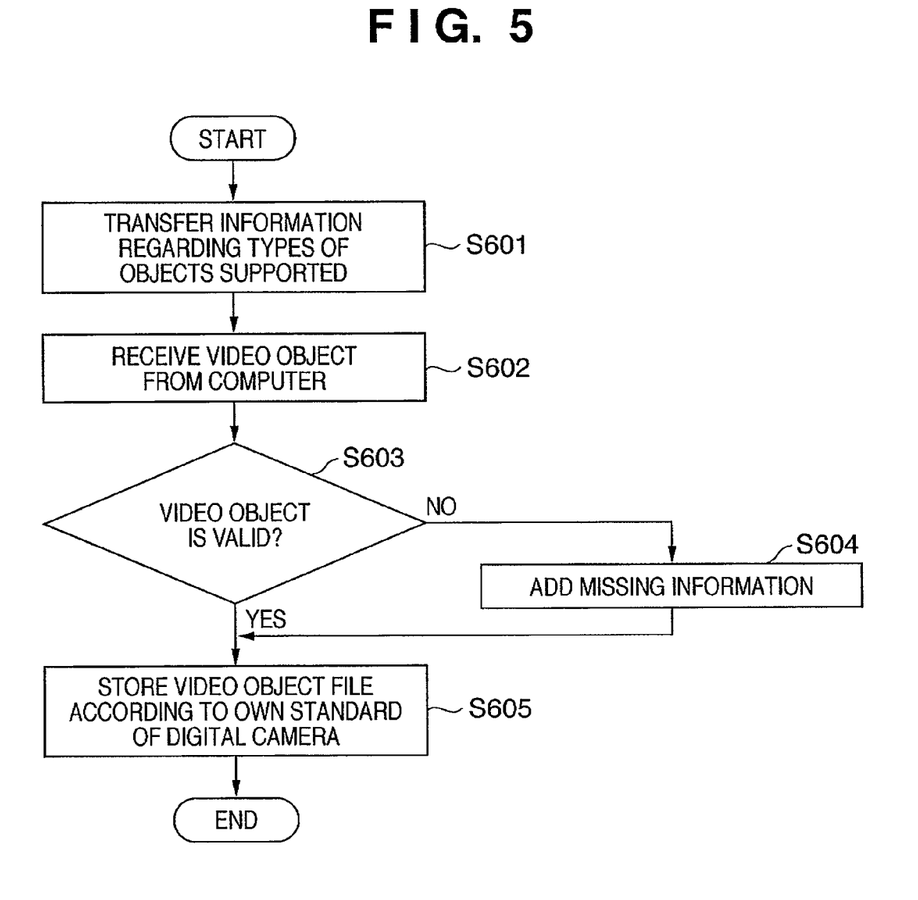
FIG. 5 is a flowchart illustrating operations of the digital camera 100 when the computer 101 transfers video data to the digital camera 100 according to the first embodiment of the present invention.

FIG. 5 is a flowchart illustrating operations of the digital camera 100 when the computer 101 transfers video data to the digital camera 100.

The processing described here assumes that a connection between the computer 101 and the digital camera 100 is established. In S601, the digital camera 100 receives the request for capability information output by the computer 101 in S501. Then, the digital camera 100 reads out the capability information, which includes information regarding the types of supported objects, from, for example the ROM 200, and transfers this information to the computer 101 via the communication device 219 under the control of the communication control unit 212.

It is assumed that the digital camera 100 then receives a video object from the computer 101 while in a state in which the digital camera 100 is waiting for a request from the computer 101 (S602). The received video object is stored in, for example, the RAM 210. After receiving the video object, the digital camera 100 checks whether or not the received video object is a valid object (S603). To be more specific, the digital camera 100 checks whether or not the received video object is compliant with the DCF system, or in other words, whether or not the video object includes both a video file and the corresponding thumbnail file. If this check results in the video object being determined to be invalid, such as, for example, the case where the thumbnail file is absent, the digital camera 100 moves the process to S604. However, if it is determined that the video object is valid, the digital camera 100 moves the process to S605.

In S604, the digital camera 100 adds the missing data to the received data so that it can be handled as a video object, and then moves the process to S605. In other words, if the thumbnail file is missing, as per the aforementioned example, the digital camera 100 generates a thumbnail image from the received video file.

Note that if only the thumbnail file has been received, and the video file is missing, the digital camera 100 may return a pre-set event indicating this to the computer 101. Then, the computer 101 may add the missing data, re-generate the video object, and re-transfer the video object after confirming the missing data based on the received event.

In S605, the digital camera 100 stores the video object in the storage medium 218, and the process ends. At this time, the digital camera 100 separates the individual files that make up the video object based on the format information of the object received prior to the video object itself. Then, the digital camera 100 stores the separated files within the storage medium 218 so the files can be handled as related files. To be more specific, the video file and thumbnail file are stored in the same folder, in accordance with a predefined rule, such as, for example, the DCF system. For example, if the AVI file 301 and the THM file 302 shown in FIG. 2 have been received as a video object, those individual files are stored in the same folder.

Figure 6:
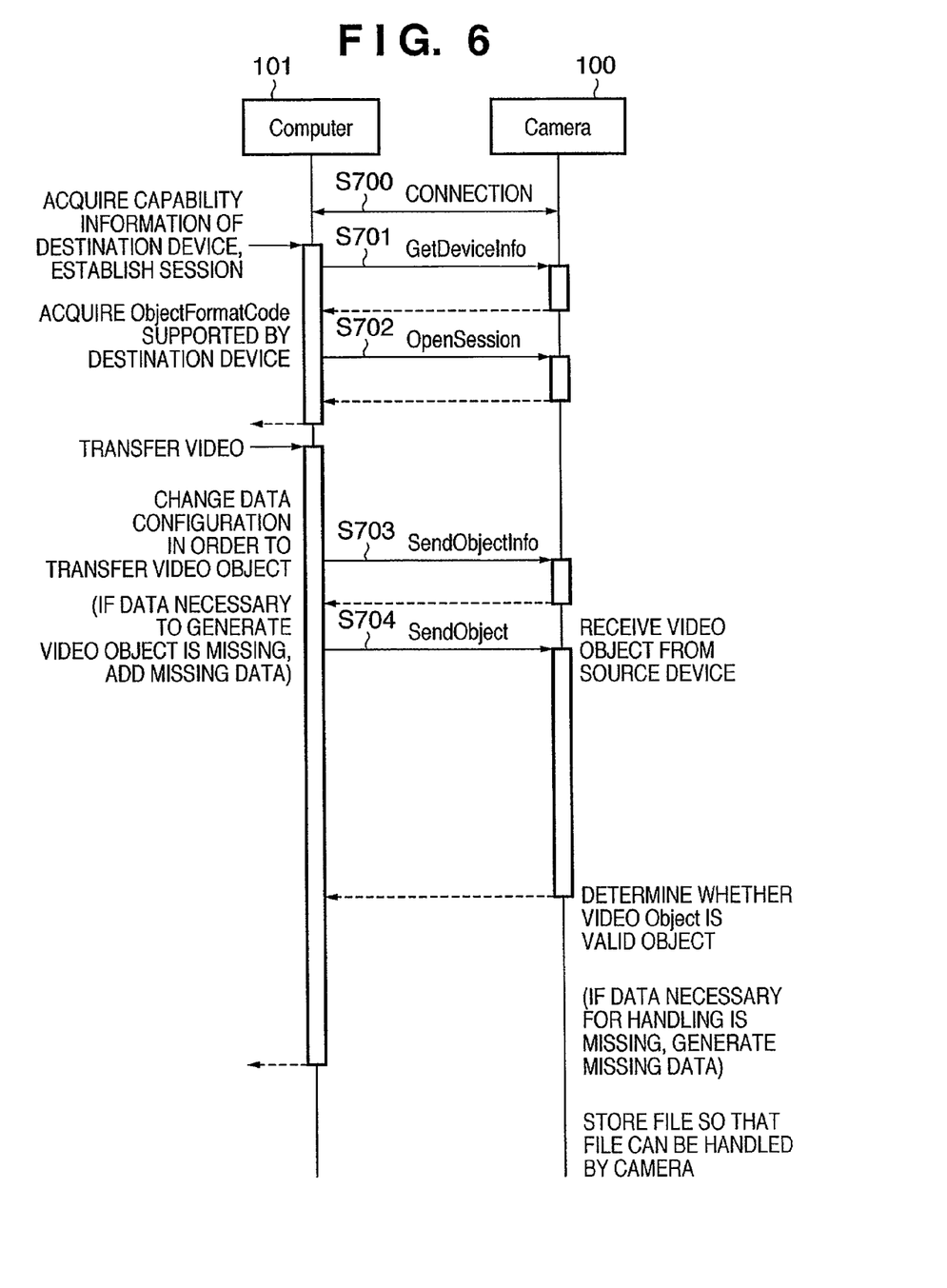
FIG. 6 is a sequence chart illustrating an order of the processes of the computer 101 and the digital camera 100 illustrated using the flowcharts in FIGS. 4 and 5.

FIG. 6 is a sequence chart illustrating an order of the processes of the computer 101 and the digital camera 100 illustrated using the flowcharts in FIGS. 4 and 5. The details of the order of communication carried out between the computer 101 and the digital camera 100 shall be described hereinafter using the sequence chart of FIG. 6.

First, in S700, the computer 101 and the digital camera 100 are connected through a USB cable or the like, and communication between the two devices is established. Note that any hard-wired or wireless connection standard can be used as long as that standard enables the computer 101 and the digital camera 100 to communication with one another.

First, the computer 101 issues a PTP command to the digital camera 100, and acquires information regarding the capability of the digital camera 100. More specifically, in S701, the computer 101 issues a PTP command GetDeviceInfo to the digital camera 100. In response to this command, the digital camera 100 returns information regarding the camera (a DeviceInfo dataset). Information regarding the types of objects supported by the digital camera 100 is denoted as a code (ObjectFormatCode) within this information. Accordingly, the computer 101 can confirm the types of objects supported by the digital camera 100 by referring to the capability information returned by the digital camera 100.

In S702, the computer 101 issues a session establishment command (OpenSession) so as to establish a session (a logical connection) for implementing communication with the digital camera 100 based on PTP. The session is established when the digital camera 100 responds normally to the session establishment command. Communication using PTP commands other than the GetDeviceInfo command is possible once the session has been established.

Here, it is assumed that the user uses the application running on the computer 101 to input an instruction to transfer a video file (AVI file 301) stored in the storage medium 223 of the computer 101 to the digital camera 100 via the operation unit 221.

In response to this instruction, the computer 101 executes the processing from S503 to S505 shown in FIG. 4, and generates the video object configured as shown in FIG. 7.

Next, the computer 101 carries out the transfer process (FIG. 4, S506).

Specifically, the computer 101 first issues a SendObjectInfo command to the digital camera 100 prior to the actual transfer of the video object (S703). The SendObjectInfo command is a command that communicates information regarding the object to be transferred (the ObjectInfo dataset) to the device that is the destination of the transmission. The format of the object, a file name, and so on are included in the information regarding the format of the object. Here, the format information including values indicating the format of the video object shown in FIG. 7 are communicated.

By receiving the format information of the data object to be transferred from the computer 101 prior to the transfer of the object itself, the digital camera 100 can confirm the type of object that is incoming. In present embodiment, the digital camera 100 confirms that a video object of the format shown in FIG. 7 is incoming, based on the format information.

After this, the computer 101 issues a SendObject command to the digital camera 100 and transfers the video object thereto (S704, and S506 in FIG. 4). Having received the video object, the digital camera 100 executes the processes from S603 to S605 shown in FIG. 5 on the received video object, based on the format information. By implementing such a sequence, it is possible to realize transmission of video data, made up of a plurality of files, from the computer 101 to the digital camera 100.

In this manner, in the present embodiment, the computer 101 generates a video object from multimedia data made up of a plurality of files and transfers that video object. Then, the digital camera 100 separates the received video object into the plurality of files, and stores the resultant in a file configuration that the digital camera 100 can handle.

In other words, it is possible, when transferring data using an object-based protocol, to communicate the relationship of the files to be transferred to the destination device, making it possible for the data to be handled in an appropriate manner at the destination device.

Furthermore, if data necessary for generating a video object, handling a received video object, and so on is missing, at least one of the computer 101 and the digital camera 100 adds that missing data. The video object is then generated, files are stored, and so on.

Accordingly, even if, for example, the user carries out a transfer instruction having only selected one of a video file and a corresponding thumbnail file, the data can be stored in the destination device in a manner that makes it possible to handle the data as a video object.

Note that a situation where the data object formation used by the computer 101 for transferring a plurality of related files (for example, the format shown in FIG. 7) is not supported by the digital camera 100 can also be considered. In such a situation, if the user has specified a video file in the transfer instruction as a target file to be transferred, the user can be notified that the file cannot be handled by the data receiving apparatus even if the file is transferred, by displaying a message indicating the same in the display device 222. The user can therefore know that the file s/he has specified is multimedia data not capable of being handled by the digital camera 100 prior to carrying out the transfer. Furthermore, the transfer being successful means that the multimedia data can handled with certainty on the receiving side, which makes it possible to improve the usability of the system.

The processes described hereinafter are also possible.

In the sequence described using FIG. 6, the computer 101 generates a single object from multimedia data made up of a plurality of files (a video file and a corresponding thumbnail file), and transfers that object.

However, there are cases where it is preferable to divide and transfer the data, such as the case where, for example, the video file is large.

Figure 8:
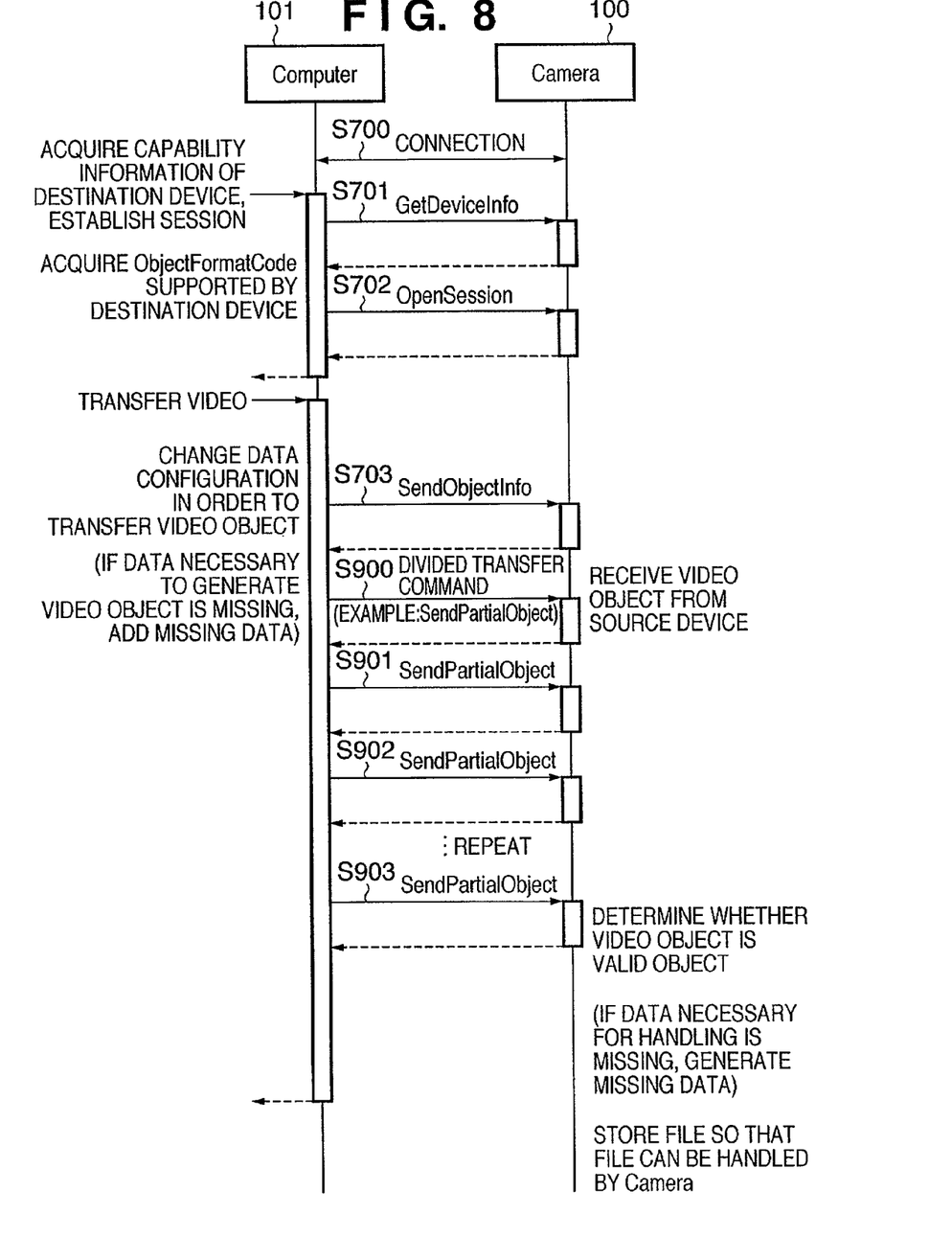
FIG. 8 is a sequence chart illustrating an exemplary procedure performed when transferring a video object from the computer 101 to the digital camera 100 according to a variation on the first embodiment of the present invention.

FIG. 8 is a sequence chart illustrating an exemplary procedure performed when dividing and transferring a video object from the computer 101 to the digital camera 100.

In S703, the computer 101 issues a SendObjectInfo command, communicating the format information of the video object to be transferred and that the video object will be divided and transferred, prior to transfer of the video object itself. The number of divisions may also be communicated as necessary. Moreover, the format information may include the fact that the object is to be divided and transferred, the number of divisions, and so on.

The computer 101 commences transfer of the video object in S900. This differs from S704 in FIG. 6 in that the video object is divided and transferred. A divided transfer command (SendPartialObject) can be executed as, for example, a vendor extension command.

The computer 101 divides the video object configured as shown in FIG. 7 into a predetermined number of regions. The computer 101 then transfers the divided data on a data region-by-data region basis. Accordingly, the data regions transferred in S901, S902, and S903 all differ from one another. The data is transferred sequentially, moving from one transferred data region to the next, and in S903, the transfer of all the data shown in FIG. 7 is completed.

The digital camera 100 stores the sequentially received data in the RAM 210, and sequentially reconfigures the video object. Upon receiving the final data region in S903, the digital camera 100 completes the reconfiguration of the video object, and carries out a similar storage process as that illustrated in FIG. 6.

An advantage of dividing and transferring the video object is that it is possible, for example, to confirm the transfer progress in the computer 101 and the digital camera 100. Furthermore, if the connection is disconnected during transfer, the digital camera 100 can determine that transfer of the object failed. Therefore, data that has only been partially transferred can be detected as a data object of a format that cannot be properly handled by the digital camera 100, and can thus the object can be deleted. As a result, the data of incomplete video objects does not remain in the digital camera 100, and thus files inconsistent with the computer 101 are not generated.

Second Embodiment

In the first embodiment, multimedia data made up of a plurality of files is transferred as a single object.

As opposed to this, in the present embodiment, the source device (computer 101) communicates the relationship of the plurality of files that make up the multimedia data to the destination device (digital camera 100), after which each file is transferred as an individual object. Then, the digital camera 100 recognizes the relationship between the received data objects based on the file relationship communicated prior to the transfer of the data objects, and stores the data objects based on that relationship.

Figure 9:
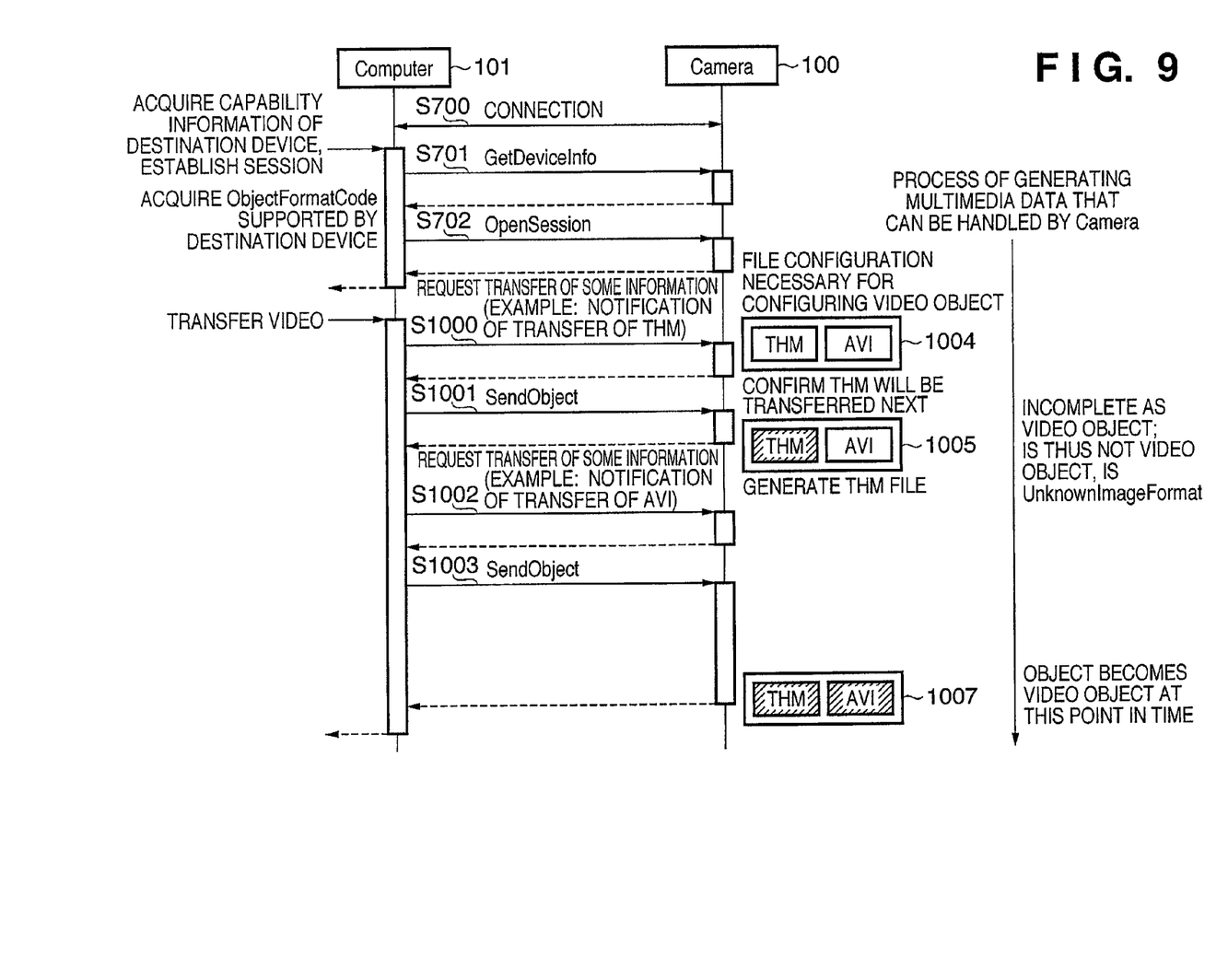
FIG. 9 is a sequence chart illustrating an exemplary procedure performed when transferring a video object from a computer 101 to a digital camera 100 according to a second embodiment of the present invention.

FIG. 9 is a sequence chart illustrating an exemplary procedure performed when transferring a video object from the computer 101 to the digital camera 100 according to the present embodiment. Procedures already described with reference to FIG. 6 shall be given the same reference numerals, and descriptions thereof shall be omitted. Furthermore, the present embodiment assumes that the files specified by the user to be transferred are a video file and a corresponding thumbnail file.

In S1000, the computer 101 communicates information regarding the file to be transferred to the digital camera 100, or to be more specific, notifies the digital camera 100 that a plurality of related files are about to be transferred.

This notification may be implemented by communicating a pre-set ObjectFormatCode indicating the transfer method, the format of the data object, and the like of the present embodiment, using the SendObjectInfo command; or, another command may be used. Either method may be used, as long as the digital camera 100 can confirm that a plurality of related files are to be transferred.

The present embodiment assumes that the configuration of the video object notified by the computer 101 and confirmed by the digital camera 100 is, as indicated by 1004 in FIG. 9, a video object made up of an AVI file and a corresponding THM file.

Accordingly, the digital camera 100 confirms that the data object that the computer 101 will now transfer is a video file and a thumbnail file corresponding to the video file.

In S1001, the computer 101 transfers a thumbnail file as a single data object using the SendObject command. Having received this data, the digital camera 100 generates a DCF thumbnail file. The video object at this point in time is incomplete, as indicated by reference numeral 1005, and thus is handled as an Unknown Image Object.

Next, in S1002, the computer 101 notifies the digital camera 100 of the transfer of the video file corresponding to the thumbnail file transferred earlier. Having received this notification, the digital camera 100 can determine, based on the configuration 1004 of the video object, that the next object to be received is the video file corresponding to the DCF thumbnail file generated earlier.

In S1003, the computer 101 transfers the video file to the digital camera 100 as a single data object using the SendObject command. The digital camera 100 confirms that the received video file is a video file corresponding to the thumbnail file received in S1001 based on the information communicated in S1000.

Through this, the digital camera 100 recognizes that all files necessary for handling the data as a video object are present, as indicated by reference numeral 1007. Then, the digital camera 100 stores the plurality of data objects (thumbnail files and video files) received from the computer 101 within the storage medium 218 so the files can be handled as related files. As above, in the present embodiment, the video file and thumbnail file are stored in the same folder, in accordance with a predefined rule, such as, for example, the DCF system.

Note that the essence of the present embodiment is, as described above:

a notification is provided so that the digital camera 100 can recognize the relationship of the plurality of files transferred as individual data objects from the data transfer apparatus; and the data receiving apparatus recognizes individually-received data objects as related files based on the notification, and stores the data objects so they can be handled as related files.

The method and timing of the notification in the present embodiment is not intended to be limited to the descriptions of the present embodiment; another appropriate method may be employed instead.

For example, if the digital camera 100 has received a video file, the digital camera 100 may handle a thumbnail file received immediately before that video file, or received after that video file, as the corresponding thumbnail file. Alternatively, the corresponding thumbnail file may be specified when notice of the transfer of the video file is given. Furthermore, the transfer order of the thumbnail file and the video file may be reversed.

An advantage of the transfer order of the present embodiment is that, for example, when many video objects are to be transferred, the thumbnail files thereof may be sequentially transferred alone at first, and the video files thereof may then be sequentially transferred after that, thus making it possible to notify the digital camera 100 of the impending video transfer in advance. For example, the digital camera 100 can display a list of thumbnail files in the display device 217, and furthermore utilize, in the display, the number of the current video files that has been received.

Figure 10:
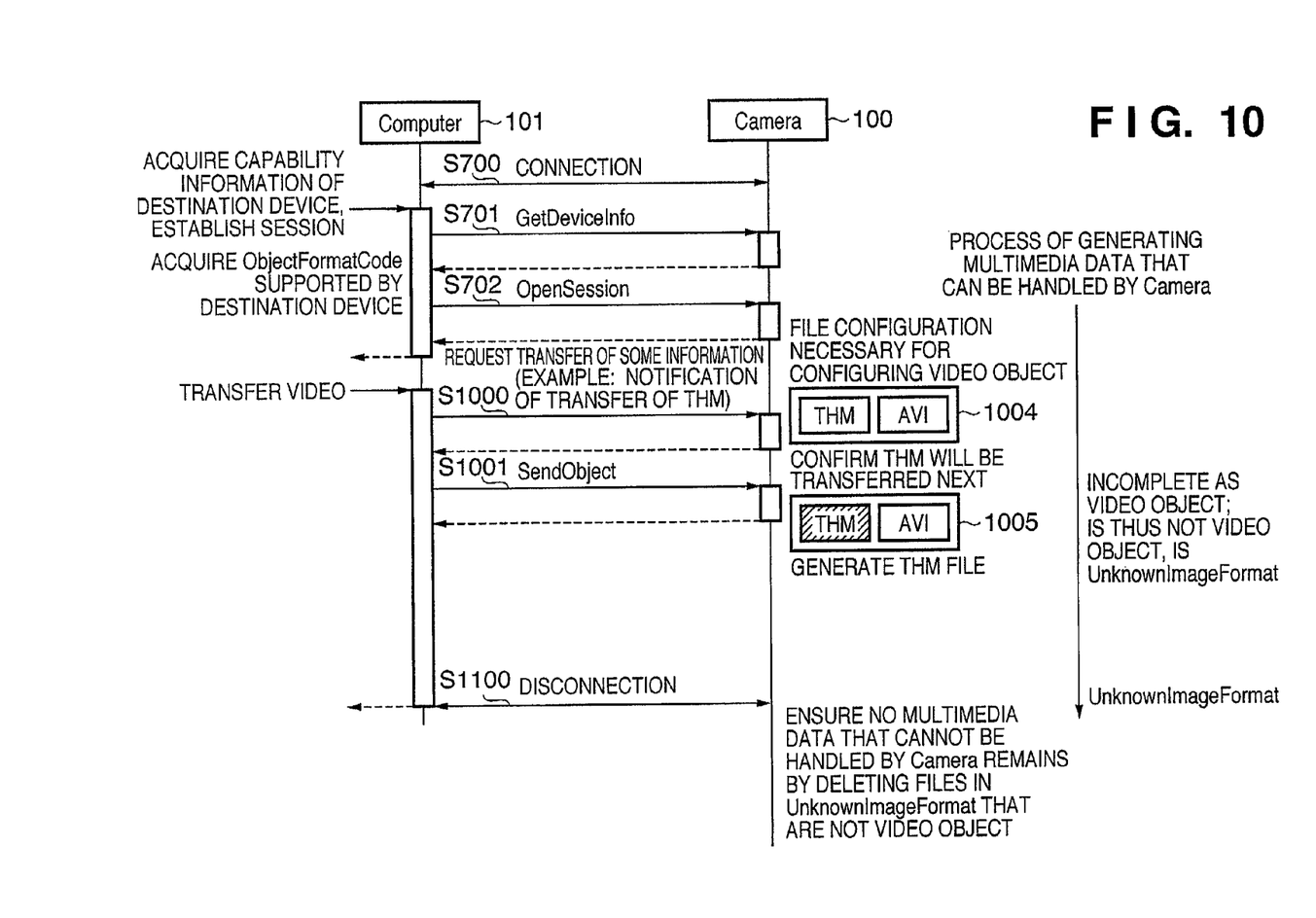
FIG. 10 is a sequence chart illustrating a process performed when the connection is disconnected during transfer, according to the second embodiment of the present invention.

Next, using the sequence chart illustrated in FIG. 10, descriptions shall be provided regarding processes carried out in the transfer procedure of the present embodiment when the connection is disconnected before the transfer of the plurality of files that make up the video object has ended.

In S1001, a thumbnail file is transferred. After confirmation that the thumbnail file was correctly transferred, the process moves to S1100, where it is assumed that the connection between the computer 101 and the digital camera 100 is disconnected. Upon detecting that the connection has been disconnected, the communication device 219 of the digital camera 100 detects data objects in a state that cannot be handled by the digital camera 100. To be more specific, the communication device 219 detects data objects in the Unknown Image Object state. Then, the communication device 219 deletes all the data objects that have been detected.

This makes it possible to prevent multimedia data that cannot be properly handled by the digital camera 100 from remaining therein, and to ensure that the storage medium 218, the RAM 210, and so on of the digital camera 100 are not used wastefully.

As described thus far, according to the present invention, multimedia data made up of a plurality of files can be transferred from the computer 101 in a manner that makes it possible for the digital camera 100, which handles such data as an object, to handle the data properly.

Furthermore, files that have finished being transferred but are in a state in which they cannot be properly handled by the digital camera 100 are deleted by the digital camera 100, and thus the storage areas of the digital camera 100 are not wasted.

Other Embodiments

In the above embodiments, PTP is used as an example of a protocol for carrying out object-based transfer, a computer is used as an example of source device from which multimedia data made up of a plurality of files is transferred, and a digital camera is used as an example of a destination device. However, it should be noted that the above are examples, and that the present invention is also applicable to communication using other protocols, apparatuses, and so on.

Furthermore, although the only example of a video object given is a video object configured of an AVI file and a corresponding THM file, image files and thumbnail files compliant with different formats may also be used.

The above embodiments may be implemented through software by a computer (or CPU, MPU, or the like) of a system or apparatus.

Therefore, the present invention is realized by a computer program supplied to a computer in order to implement the above embodiments using that computer. In other words, the computer program itself, for realizing the functionality of the above embodiments, is also included within the scope of the present invention.

Note that the computer program for realizing the above embodiments may be in any form as long as the program can be read by a computer. For example, the program can be configured using object code, a program executed by an interpreter, configured using script data and the like supplied to an OS, and so on, but is not intended to be limited thereto.

The computer program for implementing the above embodiments is supplied to a computer via a storage medium or hard-wired/wireless communication. A flexible disk, a hard disk, a magnetic storage medium such as magnetic tape, an optical/magneto-optical storage medium such as an MO, CD, and a DVD, a non-volatile semiconductor memory, and the like are examples of storage media that can be used to supply the program.

A method that utilizes a server on a computer network can be given as an example of a method for supplying the computer program using hard-wired/wireless communication. In this case, a data file (program file) that embodies the computer program that realizes the present invention is stored in the server. The program file may be an executable file, or may be source code.

The program can be supplied to a client computer that access the server by downloading the program file from the server. In this case, the program file can be divided into a plurality of segment files, and the segment files may be distributed among different servers.

In other words, a server device that supplies the program file for realizing the above embodiments to a client computer also falls within the scope of the present invention.

Furthermore, the computer program for realizing the above embodiments may be encrypted and stored in a storage medium, which is then distributed; key information for decrypting the file may be supplied to users who satisfy a predetermined condition, thereby allowing those users to install the program in their computers. The key information can be supplied by, for example, allowing the key information to be downloaded from a homepage via the Internet.

Furthermore, the computer program for realizing the above embodiments may make use of the functions of an OS already running on the computer.

Further still, the computer program for realizing the above embodiments may be partially configured of firmware for an expansion board or the like attached to the computer and executed by a CPU provided in that expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-93414, filed on Mar. 30, 2007, which is hereby incorporated by reference herein its entirety.

What is claimed is:

1. A data transfer apparatus for transferring multimedia data made up of a plurality of files to a data receiving apparatus using an object-based data transfer protocol, comprising:
   an assigning unit that assigns object identifiers for respective files stored in a storage medium, the assigning unit being capable of assigning a single object identifier to a plurality of files;
   an object generation unit that generates a single data object, which corresponds to the single object identifier, having a format supported by the data receiving apparatus, the data object including the plurality of files;
   a notification unit that communicates format information indicating the format of the generated data object to the data receiving apparatus prior to the data object being transferred; and
   a transfer unit that transfers the data object to the data receiving apparatus in accordance with the data transfer protocol.

2. The data transfer apparatus according to claim 1, further comprising:
   an operation unit that accepts a file transfer instruction from a user,
   wherein if a file necessary for the generation of the data object is not included in the file, which is a target file of the file transfer instruction, the object generation unit adds the file necessary for the generation of the data object and generates the data object.

3. The data transfer apparatus according to claim 2, wherein the plurality of files includes a video file and a representative still-image file of the video file, and if only a video file is a subject to be transferred of the file transfer instruction, the object generation unit generates a representative still-image file from the video file which is the target file and generates the data object from the generated representative still-image file and the video file which is the target file.

4. The data transfer apparatus according to claim 1, further comprising:
   a dividing unit that divides the data object into a plurality of data regions, wherein the transfer unit transfers the data object per data region into which the data object has been divided.

5. A data transfer apparatus for transferring multimedia data made up of a plurality of files to a data receiving apparatus using an object-based data transfer protocol, comprising:
an assigning unit that assigns object identifiers for respective files stored in a storage medium, the assigning unit being capable of assigning a same object identifier to a plurality of files;
a notification unit that notifies the data receiving apparatus that the plurality of files are related files prior to the plurality of files being transferred; and
a transfer unit that transfers each of the plurality of files assigned to the same object identifier as a single data object to the data receiving apparatus in accordance with the data transfer protocol.

6. A data receiving apparatus for receiving a data object from a data transfer apparatus in accordance with an object-based data transfer protocol, comprising:
a first receiving unit that receives format information indicating the format of the data object to be transferred from the data transfer apparatus;
a second receiving unit that receives the data object from the data transfer apparatus, wherein the data object corresponds to a single object identifier assigned to a plurality of files by the data transfer apparatus;
a separating unit that separates the data object into the plurality of files based on the format information; and
a storage unit that stores the separated plurality of files in a storage medium in accordance with a predefined rule, so that the files can be handled as related files.

7. The data receiving apparatus according to claim 6, further comprising:
a file generation unit that, if a file that should be included in the data object of the format indicated by the format information is missing, generates the missing file,
wherein if some of the files indicated by the format information are missing from the data object, the storage unit stores the file generated by the file generation unit and the files separated by the separation unit so that the files can be handled as related files.

8. The data receiving apparatus according to claim 7, wherein the data object of the format indicated by the format information is a data object that should include an video file and a representative still-image file corresponding to the video file, and if the representative still-image file is missing from the data object received by the second receiving unit, the file generation unit generates a representative still-image file from the video file included in the data object received by the second receiving unit.

9. The data receiving apparatus according to claim 6, further comprising:
a deletion unit that, if the connection with the data transfer apparatus has been disconnected, deletes data objects in a state that cannot be handled by the data receiving apparatus from among the data objects received by the second receiving unit.

10. A data receiving apparatus for receiving a data object from a data transfer apparatus in accordance with an object-based data transfer protocol, comprising:
a first receiving unit that receives format information indicating the format of the data object to be transferred from the data transfer apparatus;
a second receiving unit that receives the data object from the data transfer apparatus, wherein the data object corresponds to a single object identifier assigned to a plurality of files by the data transfer apparatus; and
a storage unit that stores a plurality of data objects received by the second receiving apparatus in a storage medium in accordance with a predefined rule, so that the files can be handled as related files, based on the format information.

11. A data transfer system comprising the data transfer apparatus and the data receiving apparatus, in which multimedia data made up of a plurality of files is transferred from the data transfer apparatus to the data receiving apparatus using an object-based data transfer protocol, wherein
the data transfer apparatus comprising:
an assigning unit that assigns object identifiers for respective files stored in a storage medium, the assigning unit being capable of assigning a single object identifier to a plurality of files;
an object generation unit that generates a single data object, which corresponds to the single object identifier, having a format supported by the data receiving apparatus, the data object including the plurality of files;
a notification unit that communicates format information indicating the format of the generated data object to the data receiving apparatus prior to the data object being transferred; and
a transfer unit that transfers the data object to the data receiving apparatus in accordance with the data transfer protocol,
the data receiving apparatus comprising:
a first receiving unit that receives format information indicating the format of the data object to be transferred from the data transfer apparatus;
a second receiving unit that receives the data object from the data transfer apparatus, wherein the data object corresponds to the single object identifier assigned to the plurality of files by the assigning unit;
a separating unit that separates the data object into the plurality of files based on the format information; and
a storage unit that stores the separated plurality of files in a storage medium in accordance with a predefined rule, so that the files can be handled as related files.

12. A data transfer system comprising the data transfer apparatus and the data receiving apparatus, in which multimedia data made up of a plurality of files is transferred from the data transfer apparatus to the data receiving apparatus using an object-based data transfer protocol, wherein
the data transfer apparatus comprising:
an assigning unit that assigns object identifiers for respective files stored in a storage medium, the assigning unit being capable of assigning a same object identifier to a plurality of files;
a notification unit that notifies the data receiving apparatus that the plurality of files are related files prior to the plurality of files being transferred; and
a transfer unit that transfers each of the plurality of files assigned to the same object identifier as a single data object to the data receiving apparatus in accordance with the data transfer protocol, the data receiving apparatus comprising:

a first receiving unit that receives format information indicating the format of the data object to be transferred from the data transfer apparatus;

a second receiving unit that receives the data object from the data transfer apparatus, wherein the data object corresponds to the single object identifier assigned to the plurality of files by the assigning unit; and a storage unit that stores a plurality of data objects received by the second receiving apparatus in a storage medium in accordance with a predefined rule, so that the files can be handled as related files, based on the format information.

* * * * *